Figure 1:
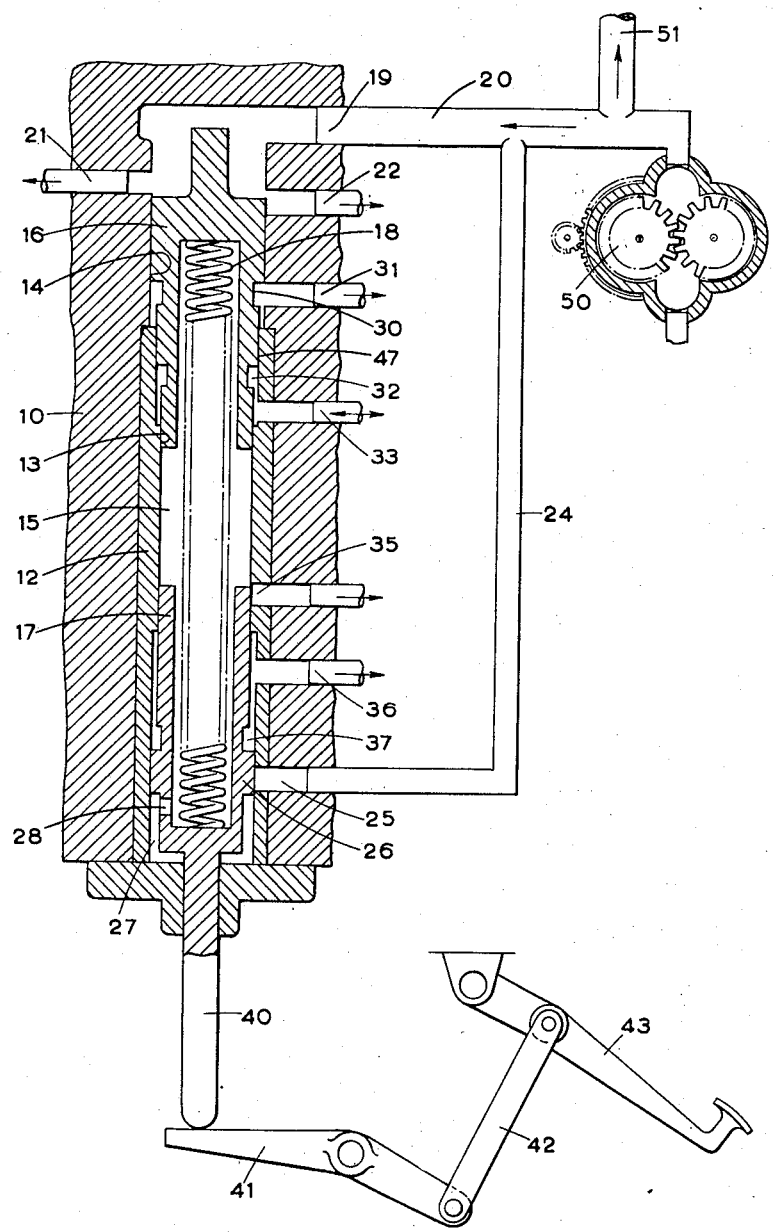

Jan. 12, 1960     H. F. HOBBS     2,920,499

POWER TRANSMISSION APPARATUS

Filed April 19, 1957     5 Sheets-Sheet 1

HOWARD FREDERICK HOBBS
INVENTOR
by *Irwin S. Thompson*
ATTORNEY

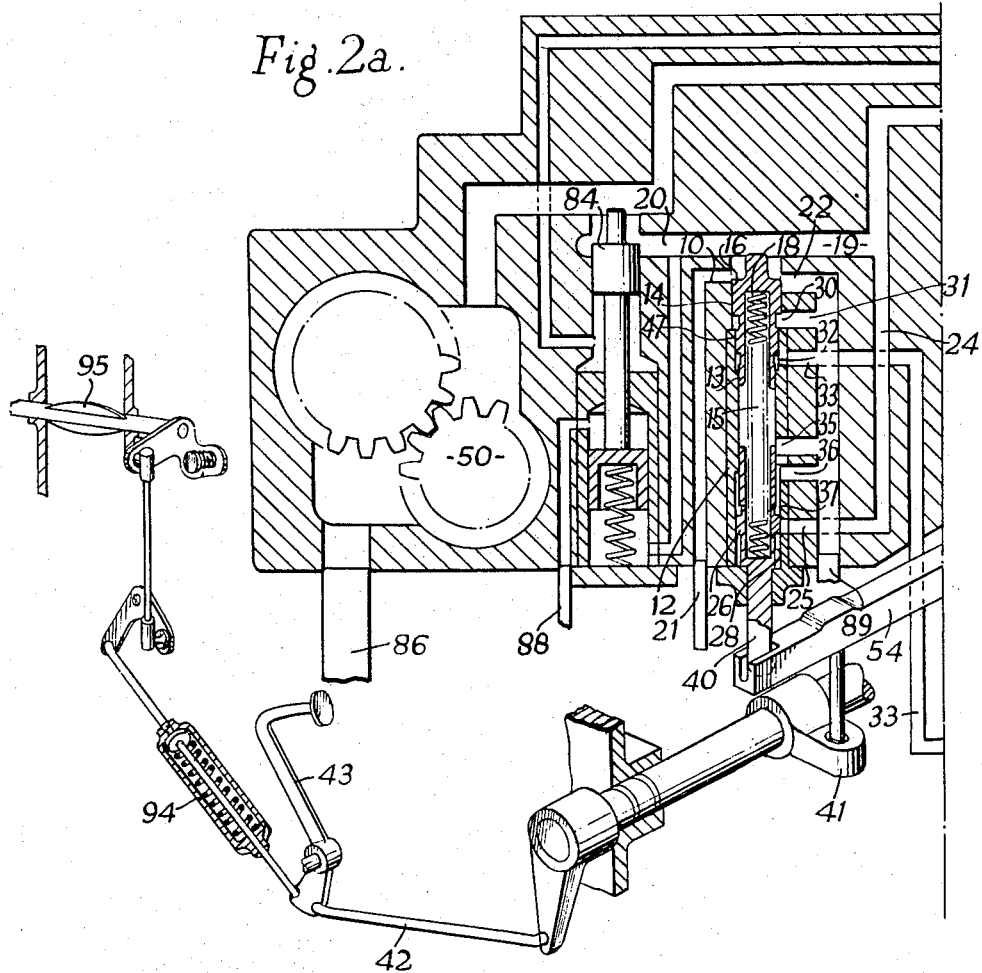

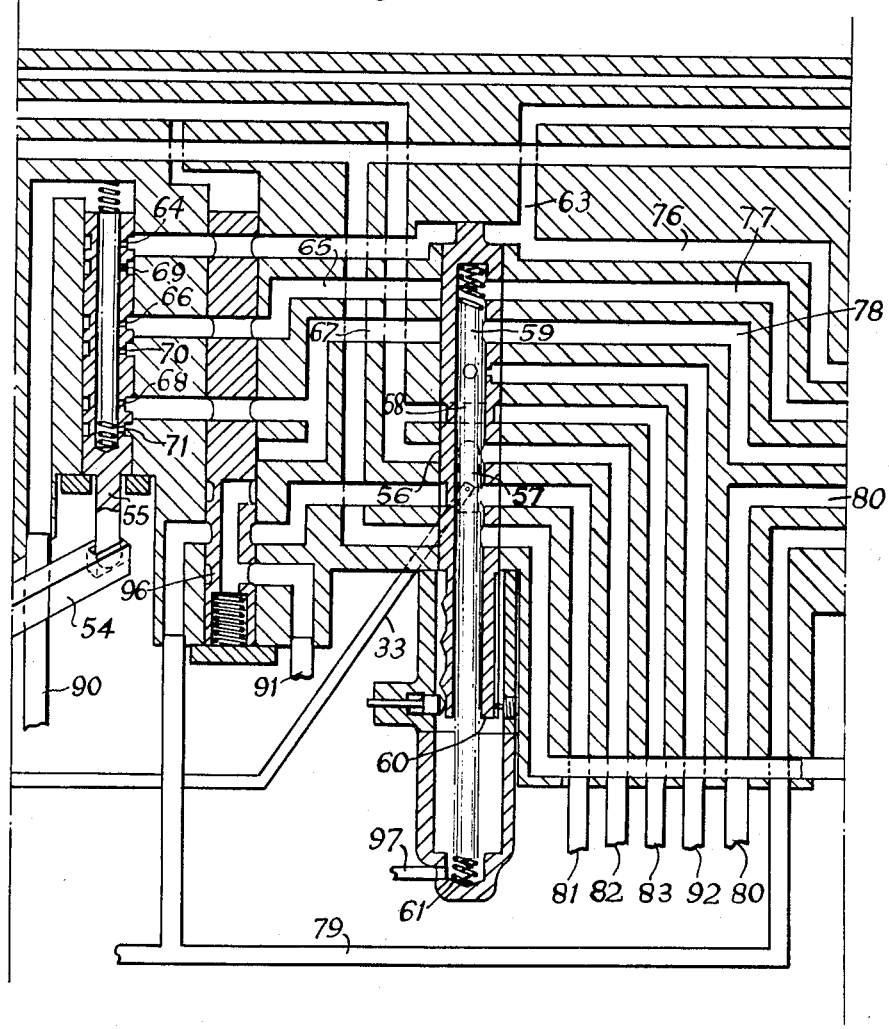

Jan. 12, 1960

H. F. HOBBS 2,920,499

POWER TRANSMISSION APPARATUS

Filed April 19, 1957

5 Sheets-Sheet 4

INVENTOR
HOWARD FREDERICK HOBBS
BY
Irwin S. Thompson
ATTORNEY

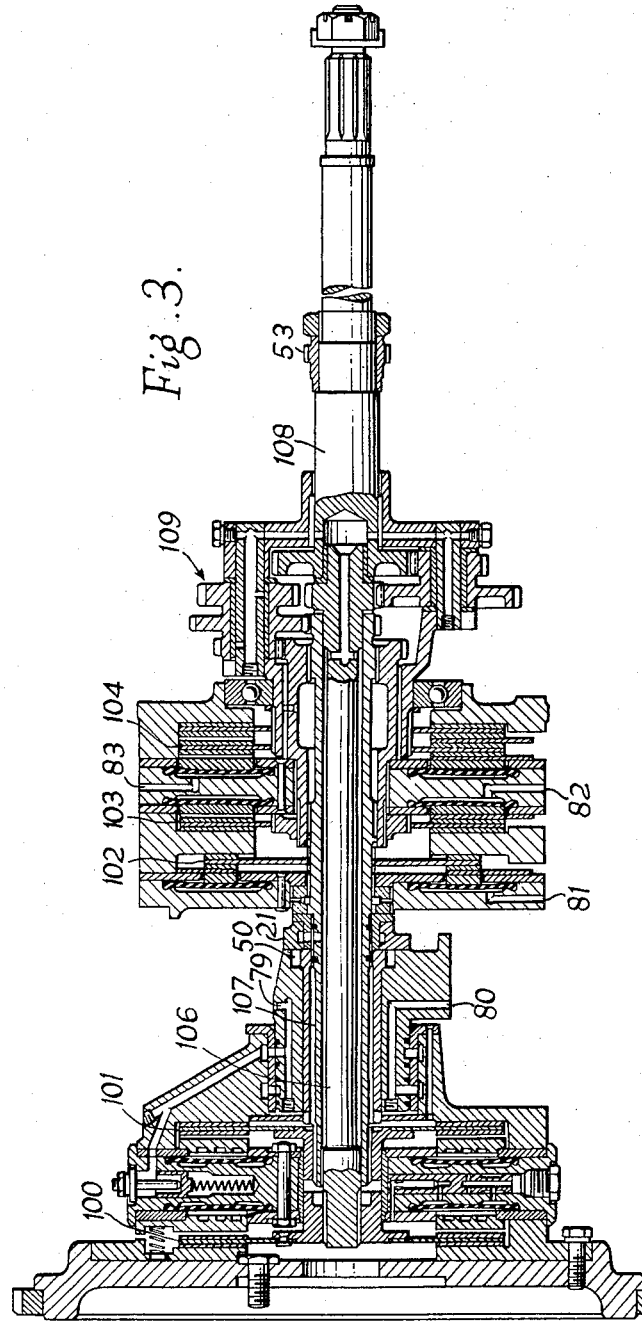

# United States Patent Office 2,920,499
Patented Jan. 12, 1960

2,920,499
POWER TRANSMISSION APPARATUS

Howard Frederick Hobbs, Leamington Spa, England, assignor to Hobbs Transmission Limited, Leamington Spa, England, a British company Application April 19, 1957, Serial No. 653,937

Claims priority, application Great Britain May 4, 1956

2 Claims. (Cl. 74—472)

This invention relates to power transmission apparatus of the kind in which changes in ratio are made by the engagement and disengagement of one or more friction engaging devices, i.e. clutches and/or brakes, which are actuated by hydraulic pressure, and which incorporates a pressure relief valve which controls the pressure in the hydraulic system and which is associated with the throttle control of the engine to which the transmission apparatus is attached so that the pressure in the system, or pressures in various parts of the system, is varied in accordance with the position of the throttle, thereby varying the pressure in accordance with the torque output of the engine.

The main object of the invention is to provide a relief valve which controls the fluid pressure which applies engaging pressure on the clutches and/or brakes of the transmission and is controlled by connection with a throttle actuating member (e.g. the accelerator pedal of a motor-car) in such a manner that, without causing heavy loads to occur on said member, the valve produces comparatively low minimum pressure when the said member is in its closed position, a substantial increase of pressure at an early part of the throttle opening movement of said member, and a further increase of pressure on further opening movement of said throttle.

According to the invention a power transmission apparatus comprises gearing providing a plurality of transmission ratios, hydraulically operated friction engaging devices engageable with said gearing at different speed conditions for effecting change of said transmission ratios, a pump having an output duct for supplying fluid pressure for engaging said devices, a stepped bore connected with said duct, two pistons located in said stepped bore, a spring located between them, the first of said pistons having two different diameters and being under said pressure in the direction to move it towards the second piston against the action of the spring, said first piston serving to control an exhaust port of said bore, a throttle opening member for actuating the second piston and opening a fluid inlet port to said bore at the beginning of the throttle opening movement of said member, said fluid inlet port admitting liquid pressure between the pistons to act on the smaller diameter part of the first piston to urge the latter towards the exhaust closing position, whereby a low pump pressure is provided when said member is closed and a substantially increased pressure is provided adequate to carry the transmission torque when the throttle opening movement of said member is effected.

Figure 2C:
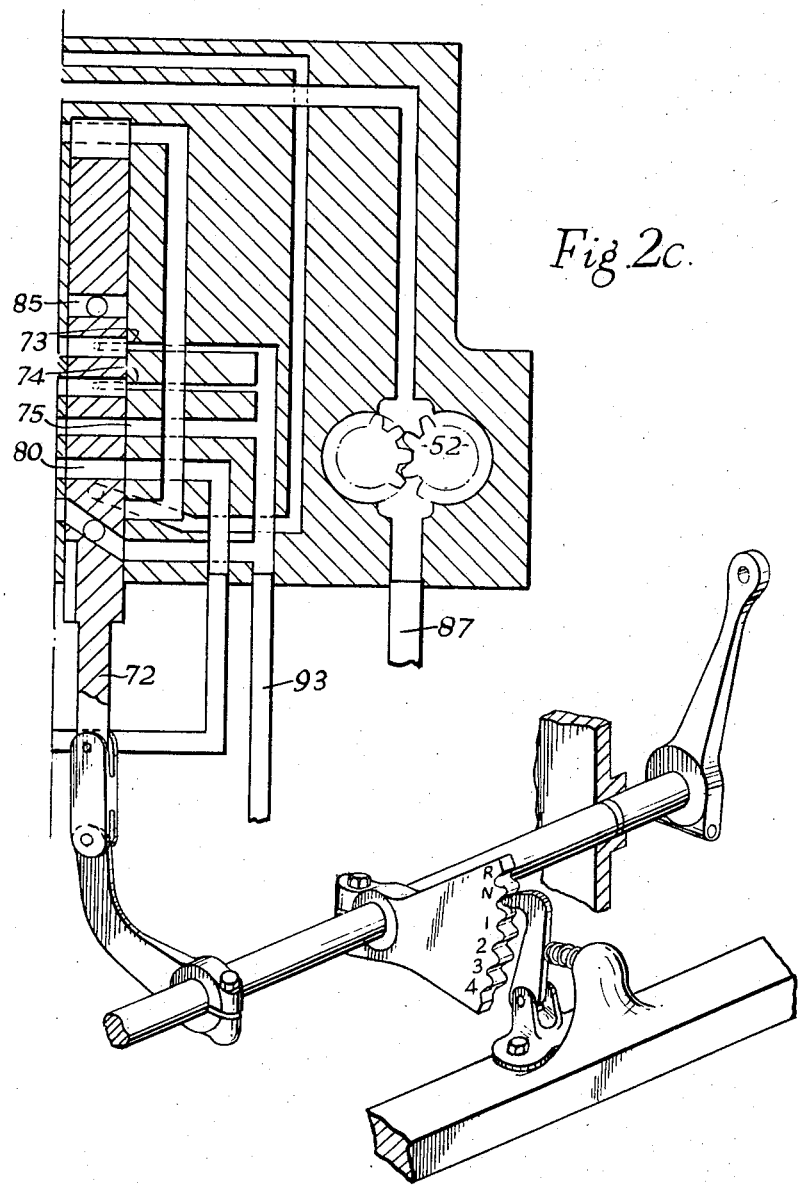

A constructional form of the invention will now be described with reference to the accompanying diagrammatic drawing wherein:

Figure 1 is a sectional view of a relief valve and associated parts made in accordance with the invention;

Figure 2 (drawn as separate Figures 2a, 2b, 2c) is a more detailed drawing showing the same parts as in Figure 1 together with connections to the accelerator pedal; and Figure 3 shows a transmission apparatus to be connected to and controlled by the apparatus of Figures 1 and 2.

A valve block 10 contains a relief valve bore having a sleeve 12 therein which in effect forms part of the bore whereby the bore has a part 13 of smaller diameter than a larger diameter part 14, and an intermediate diameter part 47. The stepped bore contains a first hollow piston 16 and a second hollow piston 17 having a helical compression spring 18 located between them and urging them apart. A space 15 is provided between the pistons. The piston 16 has parts of corresponding diameter to the diameters 13, 14, 47.

The pistons 16, 17 may take the place of the relief valve 53 shown in Figure 3 of the specification of British Patent 738,588.

The block has a duct 19 connected to an oil pressure supply tube 20, which is connected to the output of a pump 50, this output and the tube 20 being also connected by a pipe 51 to the clutches and/or brakes. The oil pressure from the pump 50 acts directly on the end of the first piston and leads to a duct 21 through which some oil is supplied for lubrication of parts of the transmission and to an exhaust port 22 controlled by the first piston.

The oil supply tube 20 is connected by pipe 24 to an inlet port 25 controlled by an enlarged diameter part 26 of the second piston. The second piston is of reduced diameter to leave a gap 27 between it and the bore and has a hole 28 providing communication between the gap 27 and the interior of the piston.

The first piston has an annular space 30 communicating with a draining duct 31, and an annular space 32 communicating with a duct 33 through which oil pressure is supplied in certain transmission ratios when torque transmission is high, and the pressure supplied at 33 is reduced when the driving torque is shared by two clutches or brakes.

The second piston controls an exhaust port 35 and a draining duct 36 communicates with a gap 37 around the piston.

The second piston carries a rod 40 that projects through the end of the bore and is engaged by one end of a lever 41 that is connected by a link 42 to a throttle actuating member 43, e.g. the accelerator pedal of a motor-car.

Movement of the throttle actuating member 43 varies the load on the spring 18 and also controls the porting 25 and 35.

When the throttle member is in its closed position, as shown in the drawing, the pressure port 25 is closed and the exhaust port 35 is opened, and there is therefore no pressure in the space 15. The pressure provided by the relief valve is that given by the load from the spring 18 only. When the throttle member is opened slightly, the pressure port 25 is opened and the exhaust port 35 closed. Pressure then acts in the space 15, entering by means of gap 27 and hole 28, and on the relief valve piston 16, thereby providing considerable increase in pressure of oil in the duct 19, and pipe 20, and consequently in the duct 51 connecting the tube 20 to the clutches and/or brakes of the transmission. It will be observed that the area open to this pressure will be substantially less than that exposed to the tube 20, because the diameter 13 is smaller than the diameter 14.

When the pressure is opened to the space 15, it acts on both ends of the piston 17; this avoids increasing the load on the accelerator pedal and the diameter of the piston at 26 can be such that most of the load to overcome the spring 18 and the pressure in the space 15 is balanced.

The purpose of the drains 31 and 36 is to allow any leak to exhaust. The space 32 and the diameter 47 is used for increasing pressure in the tube 20 for certain conditions, for example, all ratios except direct drive. The duct 33 is controlled by a valve or valves (not shown) which select the ratios so that pressure will be opened in some of the ratios but not in others.

The minimum pressure will be controlled by the load from the spring in the fitted condition with the throttle member closed. The sudden increase in pressure occurring upon opening the port 25 will be dependent on the spring load and the areas on which the pressure acts and the gradual increase over the remainder of the opening movement of the throttle member depends on the rate of the spring and the difference in load obtained as the throttle is opened and the spring compressed. The relative diameters 13 and 47 enable different ranges of pressures to be selected for the different conditions of operation, i.e. when 33 is opened to pressure or exhaust.

The main effect of the invention is to provide a relatively low pressure when the throttle is shut, so as to soften the changing-down action, particularly when coming to rest, with a substantial increase in pressure so as to be adequate to carry the drive as soon as the throttle is opened. The spring 18 can be of fairly low rate for some applications, so that the pressure reaches almost the maximum as soon as the throttle is opened. This is particularly necessary when applied to oil engines. In some cases the throttle controls operate the oil engine governor and at low speeds it is possible to get full torque even though the throttle is opened slightly. In the case of a petrol engine, it is advisable to have substantial variation over the range main opening movement, but in any case the pressure rise at the opening of the port 25 may be 60 or 70% of the maximum pressure.

The rod 40 is actuated by the lever 41 through the beam 54, the other end of which moves the valve 55 when the pedal 43 is moved beyond the position giving full engine throttle. The duct 33 leads to the bore 56 and mates with the slot 57 or the groove 58 or the exhaust opening 59 in the valve 60 according to its position in the bore. The valve 60 is caused to take up different positions by the action of spring 61 and the pump 52, the oil delivered by the pump 52 driven from the output shaft by the gear 53 is led to the space at the end of the valve by means of duct 63 and can escape through opening 64 in the valve 55. Increase in speed of the pump 52 causes increase in pressure which causes the valve 60 to move and open the duct 65, in which position further escape of the oil can take place from opening 66. Still further increase in speed of the pump 52 causes the valve 60 to open the duct 67, when still further escape can take place at opening 68. Movement of the valve 55 by means of the beam 54 to its alternative position causes the openings 69, 70 and 71 which are larger than 64, 66 and 68, to be brought into use.

The manually positioned valve 72 controls further openings 73, 74, 75 which allow additional oil to escape through ducts 76, 77, 78. This causes the valve 60 to be positioned when required by positioning the valve 72.

The valve 60 directs pressure from the pump 50 to the clutches and brakes of the transmission, the duct 79 leads to the front clutch 100 and the duct 80 to the rear clutch 101, the duct 81 to the front brake 102 and the duct 82 to the centre brake 103, and the duct 83 to the rear brake 104. The relief valve 84 controls the pressure applied to the rear and centre brakes and the pressure on the front brake and the two clutches is controlled by the relief valve 16. The front clutch 100 is fixed on a centre shaft 106 and the rear clutch 101 is fixed on a sleeve 107. The shaft 106 and sleeve 107 drive an output shaft 108 through an epicyclic gearing indicated generally at 109 which is controlled to give different transmission ratios by means of the brakes 102, 103, 104. The gearing 109 and brakes are more particularly described in Patent No. 2,825,245. First ratio is provided with the valve 60 in the position shown and the rear brake and front clutch are engaged. 2nd ratio is provided when the valve 60 moves downwards one stage and the centre brake and front clutch becomes engaged. 3rd ratio is provided when the valve moves the next stage and the front brake and front clutch become engaged. 4th ratio is obtained when the valve moves the next stage, and both clutches are engaged. The valve 72 is shown in the position giving neutral. To obtain reverse this valve is moved upwards one stage in which case the rear clutch and rear brakes are engaged. Automatic operation is provided when the valve 72 is moved downwards until the drilling 85 aligns with the duct 80. The suctions pipes 86, 87 lead to the base of the sump and the exhausts 88, 89, 90, 91, 92, 93 and 87 open to the sump. The lost motion device 94 yields when the engine throttle 95 is fully opened and the pedal 43 is moved a little further to move the valve 55. The purpose of the valve 96 is to automatically connect the pump 52 to the ducts leading to the clutches and brakes when the pump 50 is stationary so that the engine may be started by pushing or towing the vehicle.

I claim:

1. In an apparatus comprising an engine having a throttle opening member, and a power transmission device connected to the engine and having gearing providing a plurality of transmission ratios, hydraulically operated friction engaging devices engageable with said gearing at different speed conditions for effecting change of said transmission ratios and a pump having an output duct for supplying fluid pressure for engaging said devices, the provision of a pressure regulating valve for controlling said fluid pressure and comprising a stepped bore connected with said duct, two pistons located in said stepped bore, a spring located between them, the first of said pistons having two different diameters and being actuated by the fluid pressure in a direction to move it towards the second piston against action of the spring, said first piston serving to control a pressure release exhaust port, a mechanical connection between the second piston and a throttle opening member for actuating the second piston, a fluid inlet port to said bore so positioned as to be uncovered by said second piston, at the beginning of the throttle opening movement of said member, said fluid inlet port admitting fluid pressure to act on part of the first piston to urge the latter towards the pressure release closing position, the compression of said spring being varied according to opening movement of said member; whereby a low fluid pressure is provided when said member is closed and an increased pressure with throttle opening movement of said member the fluid pressure being substantially increased at the beginning of the throttle opening movement so as to provide suitable pressures to carry the transmission torque under all conditions of operation.

2. An apparatus as claimed in claim 1, wherein the second piston is formed to admit fluid pressure to both ends thereof during throttle opening.

References Cited in the file of this patent

UNITED STATES PATENTS

| 2,645,135 | Frank | July 14, 1953 |
| 2,733,732 | Baker | Feb. 7, 1956 |
| 2,792,716 | Christenson | May 21, 1957 |